United States Patent [19]

Yonezawa

[11] Patent Number: 4,925,999
[45] Date of Patent: May 15, 1990

[54] METHOD FOR NON-POLLUTION PROCESSING OF HALOGENATED ORGANIC COMPOUNDS

[75] Inventor: Taiji Yonezawa, Kyoto, Japan

[73] Assignee: Yonezawa Chemical Industry Co., Ltd., Kyoto, Japan

[21] Appl. No.: 188,565

[22] Filed: Apr. 29, 1988

[30] Foreign Application Priority Data

Aug. 11, 1987 [JP] Japan .................. 62-199223
Mar. 7, 1988 [JP] Japan .................. 63-5137

[51] Int. Cl.$^5$ .................................. C07C 1/26
[52] U.S. Cl. .......................... 585/469; 208/262.5; 210/909
[58] Field of Search ............ 208/262; 210/909; 134/12, 21, 31, 37; 585/469

[56] References Cited

U.S. PATENT DOCUMENTS 4,304,612  12/1981  Masuda ................... 134/19
4,526,677   7/1985  Grantham et al. ........ 208/262

Primary Examiner—Asok Pal
Attorney, Agent, or Firm—Armstrong, Nikaido, Marmelstein, Kobovcik & Murray

[57] ABSTRACT

A method for processing halogenated organic compounds that causes no environmental pollution is provided. The method consists in subjecting the halogenated organic compounds to combustion treatment in the presence of charcoal and an oil and, as the case may be, also in the presence of a metallic catalyst.

5 Claims, 6 Drawing Sheets

METHOD FOR NON-POLLUTION PROCESSING OF HALOGENATED ORGANIC COMPOUNDS

FIELD OF THE INVENTION

The present invention relates to a method for non-pollution processing of halogenated organic compounds. More particularly, it relates to a method for processing of halogenated organic compounds, in particular chlorinated organic compounds, by combusting them, whereby preventing discharge of such compounds or of harmful compounds denatured therefrom to the environment.

BACKGROUND OF THE INVENTION

Many halagonated compounds, notably chlorinated compounds and in particular polychlorinated aromatic or alicyclic compounds are known to be useful in various fields of industry.

They include, for example, pentachlorophenol (PCP) having herbicidal and fungicidal activities, hexachlorocyclohexane (BHC) having insecticidal activity and polychlorinated biphenyl (PCB) used for the heat medium.

There are many methods for treating them after use thereof.

For example, in the case of PCB charged in transformers, it may be simply buried in the soil. This, however, can cause pollution as it may contaminate the water system under the ground. Another method is degrading halogenated organic compounds by combusting them. However, halogenated organic compounds are generally resistant to the heat degradation, and hence, considerably high temperature such as 1,300° C. or higher is required for the complete degradation of these compounds, and this makes the method inefficient. Moreover, heating of halogenated organic compounds can cause conversions of such compounds to highly toxic substances, such as polychloropolybenzodioxine (PCDD) or polychlorodibenzofuran (PCDF), which may be discharged to the environment.

Such highly toxic substances not only are generated as a result of heat conversion but are present as impurities of halogenated organic compounds in the bulk form such as PCP or 2,4,5-trichlorophenoxyacetic acid (2,4,5-T).

It is, therefore, very important to process halogenated organic compounds and/or highly toxic polyhalogenated substances efficiently without causing pollution of the environment.

BRIEF DESCRIPTION OF THE INVENTION

Figure 1:
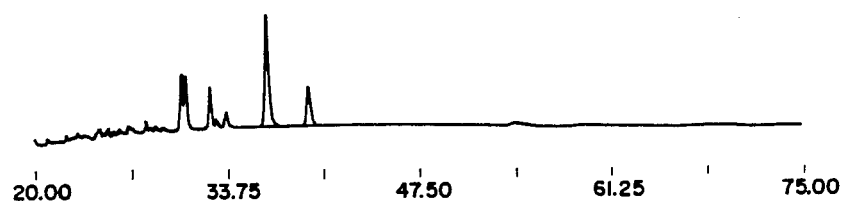
FIGS. 1–5 are the chromatograms of the gases evolved in Examples 2–6, respectively.
Figure 2:
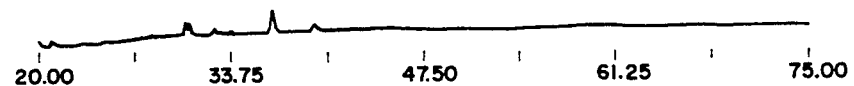
Figure 3:
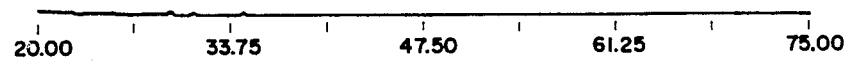
Figure 4:
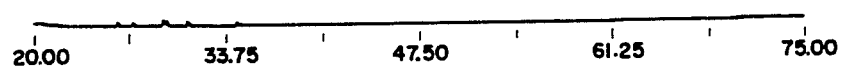
Figure 5:
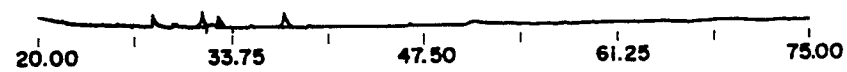

The present invention is, therefore, to provide a method for non-pollution processing of halogenated organic compounds which comprises combusting the said halogenated organic compounds together with charcoal and an oil.

The present invention is also to provide a method for non-pollution processing of halogenated organic compounds which comprises combusting the said halogenated organic compounds together with charcoal, an oil and a metallic catalyst.

DETAILED DESCRIPTION OF THE INVENTION

In the present specification, the term "halogenated organic compounds" include ones which are useful of themselves such as PCB, BHC or PCP and which are treated after their use or for other reasons, and others which are useless of themselves such as PCDD or PCDF and which are required to be treated without causing pollution to the environment.

In carrying out the method of the invention, the proportion of the halogenated organic compound to charcoal is not critical.

Generally, charcoal is used in a larger amount, for example, from 1 to 20 parts, preferably about 10 parts in respect of 1 part of the halogenated organic compound.

Charcoal represents the amphoteric character of either basic or acidic at a temperature of about 500°–800° C. However, it acts as a Lewis acid in the presence of water at a temperature of 900° C. or higher and, under these conditions, it promotes cleavege of the linkage between the carbon atom of carbocyclic group such as benzene ring and a halogen atom particularly chlorine atom, whereby promoting the degradation of the halogenated organic compound.

In the method of this invention, it is necessary to use an oil as an combustion aid in order to enable efficient combustion of large amount of halogenated organic compounds, although charcoal is combustible itself. There is no specific limitation in the nature of the oil in view of the purpose and it includes animal oils, plant oils and mineral oils. Normally, however, use of heavy oil is recommended from the viewpoint of economy. A typical heavy oil has the following characteristics: pour point of 30° C. or lower, kinematic viscosity of about 20 cps (50° C.), flashing point of about 65° C., combustion calorie of 9.700 Kcal/kg.

The proportion of the halogenated organic compound and charcoal to the oil varies depending on such factors as the proportion of the halogenated organic compound to charcoal and the water content in charcoal. It may be determined by the combustion calculation, taking into account of air volume, gas volume evolved, calories of charcoal and oil, and so on.

Normally, the amount of oil is equivalent or more to the combined amounts of the halogenated organic compound and charcoal. The maximum proportion would be around 3:7.

The mixture of the halogenated organic compound, charcoal and the oil admixed in the proportion described above should preferably be in a fluid state in the form of such as slurry.

This enables a continuous feeding of the mixture into the combustion furnace or, stated otherwise, a continual combustion processing. The mixture in a fluid status is a solid-liquid heterogeneous system, in which all the components should preferably be dispersed uniformly. Where appropriate, the mixture may be made into a fluid state of emulsion, suspension or dispersion by the addition of a small amount a suitable surfactant.

According to another aspect of the invention, a metallic catalyst is used together with the halogenated organic compound, charcoal and the oil. Such a metallic catalyst is used in order to promote the cleavage by charcoal of the carbon-chlorine linkage, whereby improving the efficacy of degradation.

The metallic catalyst includes, for example, metal salts such as sulfates and chlorides of copper, nickel, manganese and iron. The amount of the metallic catalyst may be optimized having regard to the efficacy of combustion. Normally, it may be used in a so-called catalytic amount. For example, it may be used at about equal amount to that of charcoal in the form of 1% aqueous solution or, stated otherwise, about 1/100 of charcoal.

The mixture comprising the halogenated organic compound, charcoal, the oil and the metallic catalyst is preferably be in a fluid state, as was also the case in the mixture system containing no metallic catalyst. The fluid state allows for a continuous feeding of the mixture into the combustion furnace or, stated otherwise, a continual combustion processing.

The combustion of the mixture containing or not containing the metallic catalyst is effected by feeding air into the combustion system. If desired, oxygen may be added to the air in the combustion chamber. The gas evolved by combustion such as carbon dioxide and hydrogen halides may be absorbed into a suitable trap or traps containing a suitable trapping agent such as aqueous solution of sodium hydroxide, whereby preventing discharge of the gases evolved.

According to the method of this invention, combustion may be carried out at a relatively low temperature of about 900°–1,200° C., normally at about 1,100° C. at the outlet of the combustion furnace.

The present method may advantageously be applied to the post-treatment of charcoal containing toxic halogenated compounds such as PCDD, PCDF or hexachlorobenzene (HCB) separated during the purification of PCP bulk. Namely, the inventor explored earlier a method of purifying PCP bulk to remove almost completely impurities contained therein (Japanese Patent Application No. 60-87982). The method comprises steps of dissolving PCP in an aqueous solution of an alkali, contacting it with charcoal to have impurities such as PCDD, PCDF or HCB present in small amounts in the solution adsorbed on it, and separating the charcoal from the aqueous solution by filtration.

The method is superior in terms of separation of toxic impurities. However, disposal as such of charcoal adsorbing such impurities should be avoided in view of environmental pollution, and hence, post-treatment of charcoal adsorbing impurities is necessitated.

The inventor, therefore, explored subsequently a method of treating the harmful charcoal advantageously (Japanese Patent Application No. 61-117472). The method comprises steps of maintaining the harmful charcoal at about 120° C. under reduced pressure, under which toxic impurities do not evaporate, to have water and gases on the charcoal evaporated, maintaining subsequently the charcoal at above 600° C. under reduced pressure in a closed system to have the impurities sublimed or evaporated by carbonization or heat decomposition, and separating the decomposed matter, after cooling, from the charcoal.

The method is quite superior in view of low degree of environmental pollution. However, the method requires such procedures as removal of water by preheating and separation of decomposed matter from charcoal, and therefore, much more quicker and practical method of treatment is desired.

The application of the method of the invention may be performed, for example, treating charcoal containing impurities that is recovered by a method disclosed in Japanese Patent Application No. 60-87982. Namely, impure PCP is dissolved in an aqueous solution of an alkaline substance such as sodium carbonate, potassium carbonate, sodium sulfite or potassium sulfite (normally dissolved in a heated aqueous alkaline solution) to filter off insoluble matters. Alternatively, sodium salt of PCP is dissolved in water and, if necessary, insoluble matters are filtered off. Charcoal is then added to the aqueous solution to adsorb toxic impurities on it. For the purpose of adsorption, charcoal is used in an amount of 0.1–5 parts by weight, preferably 0.2–1 part by weight, most preferably about 0.5 part by weight of 100 parts of PCP. After addition of charcoal, the solution is stirred gently for a while and the mixture is then filtered. Almost no chlorinated compounds are present in the filtrate except for PCP.

Impurities such as PCDD, PCDF and HCB are adsorbed on charcoal nearly quantitatively. About 2% of PCP are also adsorbed on the charcoal. The charcoal is then filtered to remove excess water.

The charcoal still contains, besides impurities and PCP, a large amount of water of about 70–80%. Normally, however, a further removal of water is unnecessary. The charcoal containing toxic chlorinated organic compounds and water is then mixed, if necessary, with an additional amount of charcoal, with an oil, surfactant, and further with a metallic catalyst as the case may be. The mixture is then subjected to combustion as described above.

The present invention will be described in more detail by the following Examples.

EXAMPLE 1

(1) Purification of PCP 100 g of a technical grade PCP (purity of higher than 90%), 20 g of sodium carbonate and 800 g of water were mixed and the mixture was heated at 80°–90° C. to dissolve the PCP. The solution containing a small amount of insoluble matters was mixed with 0.5 g of powder charcoal and stirred for 30 minutes. The mixture was filtered and the filtrate was made acidic to precipitate the purified PCP containing almost no toxic substances such as PCDD, PCDF or HCB.

(2) Treatment of Charcoal 2.5 Kg of a filter cake (comprised of charcoal, insoluble matters, adsorbed impurites and PCP) obtained by a scale-up of the procedure described in (1) above were mixed with 7 kg of heavy oil A and 0.5 kg of an emulsifier (Sorpol No. 150B, Toho Kagaku). The mixture was preheated and then introduced into a combustion furnace. Combustion was continued to maintain the temperature of the outlet of the furnace at 1,100° C., while blowing in air at a rate of 145 $Nm^3/h$. The concentrations of HCl and $SO_2$ at the outlet of the furnace were 36 ppm and 160 ppm, respectively. The exhaust gas was passed through an ejector, while blowing in air at a rate of 400 $Nm^3/h$ to cool and dilute the gas. The temperature of the gas at the outlet was 350° C. and the concentrations of HCl and $SO_2$ at the outlet of the chimney were 10 ppm and 44 ppm, respectively. The exhaust gas and the combustion residue in the furnace were sampled and the residue amounts of PCDD, PCDF and HCB were analyzed by the following procedures. Namely, for quantification of PCDD and PCDF the exhaust gas was dissolved in methanol and in an aqueous alkaline solution and extracted with hexane. The solid combustion residue was subjected to Soxhlet extraction with toluene. Each extract was treated with sulfuric acid and subjected to chromatography through alumina to remove intefering substances and then subjected to quantitative analysis by way of mass fragmentography with a combined gaschromatography/mass spectrography. For quantification of HCB, the exhaust gas was dissolved in an aqueous solution of sodium hydroxide and extracted with hexane. The solid combustion residue was extracted with acetone and then it was dissolved in hexane. The extract was subjected to quantitative analysis by way of mass fragmentography with a combined gaschromatograph/mass spectrograph.

The concentrations of PCDD, PCDF and HCB in the charcoal before combustion (per dry matter), in the exhaust gas and in the solid combustion residue are shown in Tables 1 and 2. The amounts of PCDD and PCDF with the respective degree of chlorination are indicated as the sum of all isomers, unless the positions of chlorine atoms are indicated.

TABLE 1

| Amount of chlorinated organic compounds contained in charcoal before combustion | |  |
|---|---|---|
| Compound | Analytical value (n = 2, μg/g) | |
| 2,3,7,8-Tetra-CDD | <0.2 | <0.2 |
| 1,3,6,8-Tetra-CDD | <0.2 | <0.2 |
| Other tetra-CDDs | 0.28 | 0.30 |
| Penta-CDD | 1.4 | 1.6 |
| Hexa-CDD | 11.8 | 15.8 |
| 1,2,3,4,6,7,8-Hepta-CDD | 44 | 46 |
| 1,2,3,4,6,7,9-Hepta-CDD | 34 | 38 |
| Octa-CDD | 3400 | 3200 |
| 2,3,7,8-TCDF | <0.2 | <0.2 |
| HCB | 3200 | 3800 |

TABLE 2

| Amount of chlorinated organic compounds contained in exhaust gas and combustion residue after combustion | | |
|---|---|---|
| Compound | Exhaust gas 9 ng/ml | Combustion residue (ng/g) |
| 2,3,7,8-Tetra-CDD | <1 | <1 |
| 1,2,3,7,8-Penta-CDD | <1 | <1 |
| 1,2,3,4,7,8-Hexa-CDD | <1 | <1 |
| 1,2,3,6,7,8-Hexa-CDD | <1 | <1 |
| 2,3,7,8-Tetra-CDF | <1 | <1 |
| 1,2,3,7,8-Penta-CDF | <1 | <1 |
| 2,3,4,7,8-Penta-CDF | <1 | <1 |
| 1,2,3,7,8,9-Hexa-CDF | <1 | <1 |
| 2,3,4,6,7,8-Hexa-CDF | <1 | <1 |
| HCB | <0.1 | <0.1 |

EXAMPLE 2

0.2 of PCB, 2 g of charcoal and 2 g of heavy oil A were mixed and placed on a glass boat, which was then placed in an electric furnace. Heating was continued for 35 minutes with aeration at a rate of 0.5–0.6 l/min. The gas evolved out from the furnace was trapped with trap 1 (200 ml of aniline), trap 2 (200 ml of hexane) and trap 3 (100 ml of hexane). The gas thus trapped was gaschromatographed under the following conditions:

| Apparatus | Yanagimoto Gaschromatograph G-388 |
|---|---|
| Detector | Non radio active electron capture detector |
| Column | Silicone OV-101, 0.25 φ × 25 m |
| Detector sensitivity | input sensitivity, $10^{-1}$ |
| | output sensitivity, 1/32 |
| Injection temperature | 260° C. |
| Column temperature | 160–245° C. (elevated temperature) |
| Detector temperature | 270° C. |

The gaschromatogram is as shown in FIG. 1

EXAMPLES 3–6

2 g each of 1% aqueous solution of the catalysts, being the same amount as charcoal, which are copper sulfate (pentahydrate), ferric chloride (hydrate), manganese sulfate (tetrahydrate) or nickel sulfate (hexahydrate), were added to the system described in Example 2. Each mixture was subjected combustion under the same conditions as those in Example 2. The results are as shown in FIGS. 2 to 5.

REFERENCE EXAMPLE 1

A mixture of Example 2, however containing no charcoal, was subjected to combustion under the same conditions as those in Example 2. The result is shown in FIG. 6.

REFERENCE EXAMPLE 2

Figure 7:
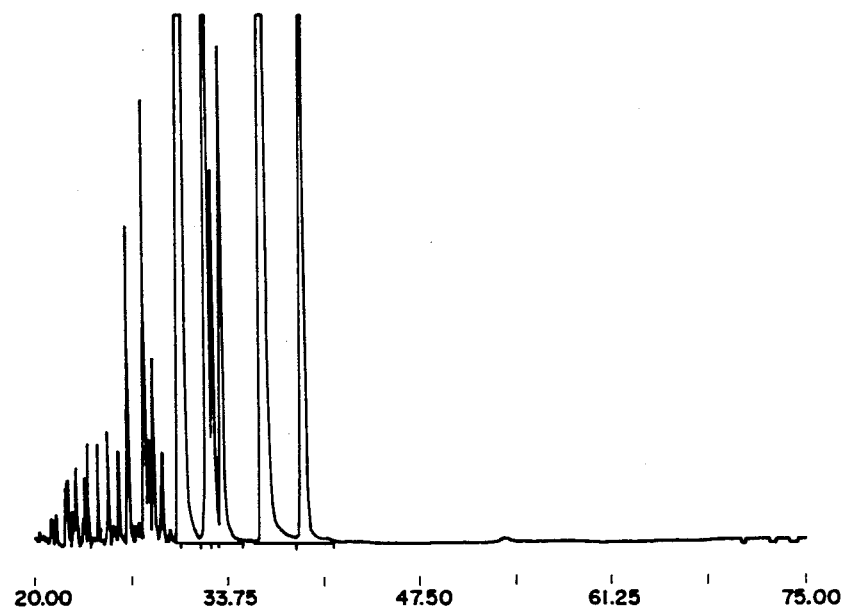

PCB as such without combustion treatment was gaschromatographed and the chromatogram is shown in FIG. 7.

Figure 6:
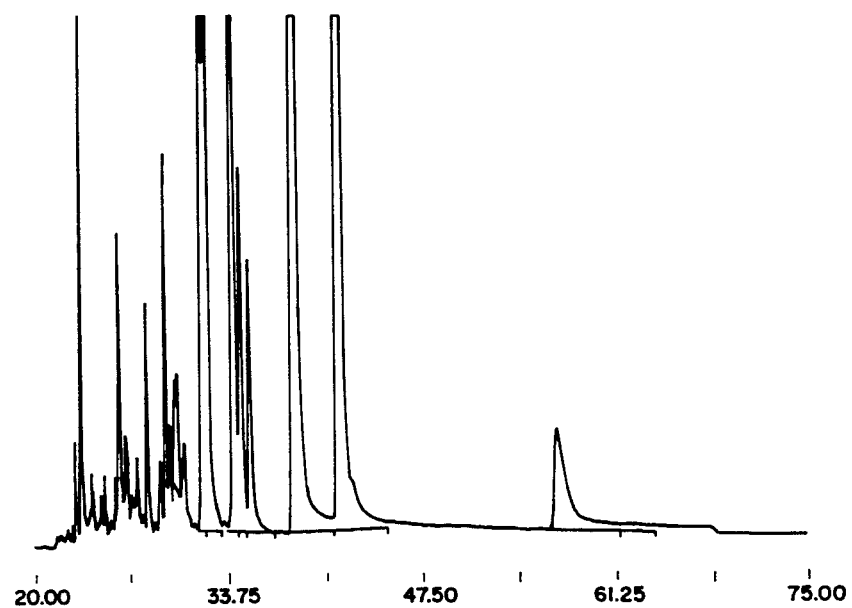
FIGS. 6 and 7 are the chromatograms of the gases evolved in Reference Examples 1 and 2, respectively.

As will be apparent from the comparison of FIGS. 6 and 7, the gaschromatogram of Reference Example 1 in which PCB was subjected to heat degradation in the absence of charcoal is almost identical with that of Reference Example 2. This means that PCB may not be degraded noticeably under the conditions of Reference Example 1, that is treatment at 900° C. for 35 minutes.

In contrast to this, the gaschromatogram of Example 2 (FIG. 1) in which charcoal was added reveals that most of PCB was dissipated. The gaschromatograms of Example 3-6 (FIGS. 2–5) in which a metallic catalyst was further added show no noticeable peaks assigned to PCB and reveals that PCB was decomposed almost completely.

EXAMPLE 7

Figure 8:
FIGS. 8–12 are the chromatograms of the gases evolved in Examples 7–11, respectively.
Figure 9:
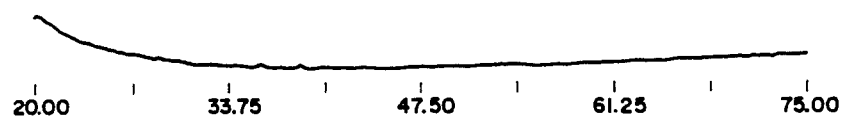
Figure 10:
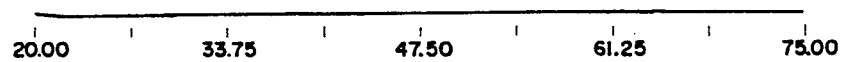
Figure 11:
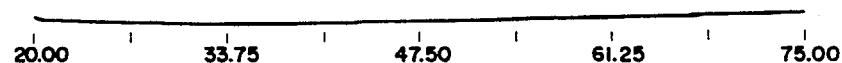
Figure 12:
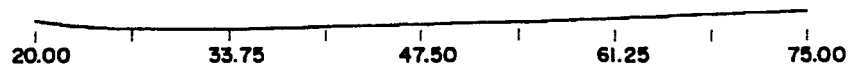

Combustion treatment similar to that of Example 2 was performed using 0.2 g of a commercially available PCP of the technical grade in place of PCB. The chromatogram is shown in FIG. 8.

EXAMPLE 8–11

2 g each of 1% aqueous solution of the catalysts which are copper sulfate (pentahydrate), ferric chloride (hydrate), manganese sulfate (tetrahydrate) or nickel sulfate (hexahydrate), were added to the system described in Example 7.

Each mixture was subjected combustion under the same conditions as those in Example 7. The results are as shown in FIGS. 9 to 12.

REFERENCE EXAMPLE 3

A mixture of Example 7, however containing no charcoal, was subjected to combustion under the same conditions as those in Example 7. The result is shown in FIG. 13.

Figure 13:
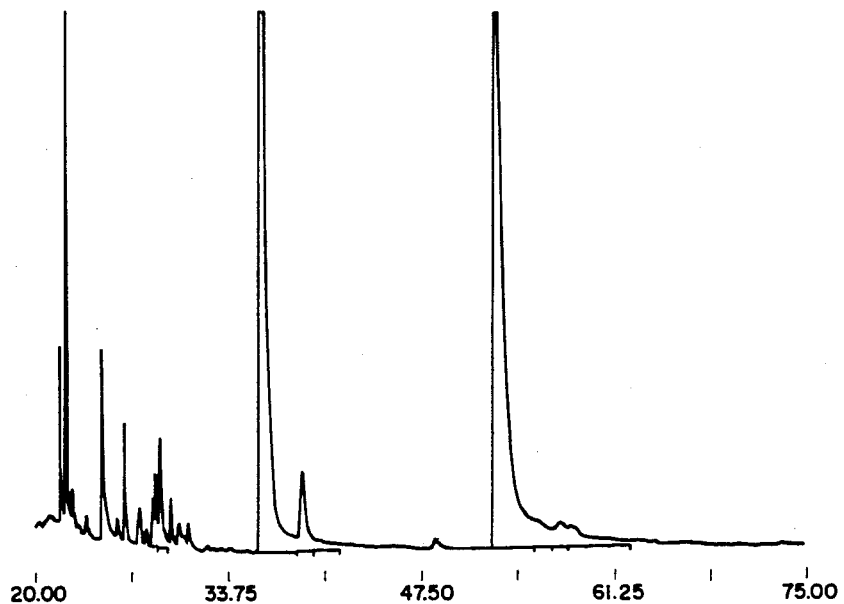
FIG. 13 is the chromatograms of the gas evolved in Reference Example 3.

As will be apparent from the comparison of FIGS. 13 and 8, the gaschromatogram of Example 7 reveals a drastic reduction in amount of PCDD or the like compared with that of Reference Example 3 without charcoal and these show clearly the heat decomposition effect by charcoal of toxic organic substances.

Further, as shown in FIGS. 9 to 12, PCDD or the like are present only at a trace amount in the systems of Examples 8 to 11 containing the metallic catalysts and these show clearly the remarkable effect by the catalysts.

EXAMPLE 12

Figure 14:
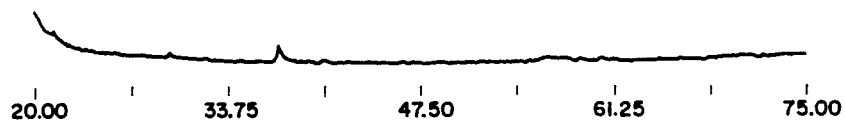
FIGS. 14–16 are the chromatograms of the gases evolved in Examples 12–14, respectively.

Combustion treatment similar to that of Example 2 was performed using 0.2 g of a commercially available BHC of the technical grade in place of PCB. The chromatogram is shown in FIG. 14.

EXAMPLE 13

Figure 15:
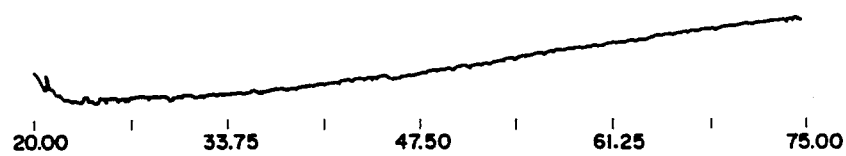

Combustion treatment was performed under the same conditions as those in Example 12, except that it was performed at a temperature of 700° C. The result is shown in FIG. 15.

EXAMPLE 14

Figure 16:
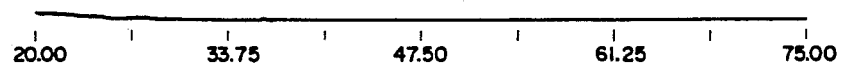

2 g of 1% aqueous solution of copper sulfate (pentahydrate) were added to the mixture of Example 12 and the combustion treatment was performed under the same conditions with those in Example 12. The result is shown in FIG. 16.

REFERENCE EXAMPLE 4

A mixture of Example 12 but containing no charcoal was subjected to combustion treatment under the same conditions as those in Example 12. The result is shown in FIG. 17.

Figure 17:
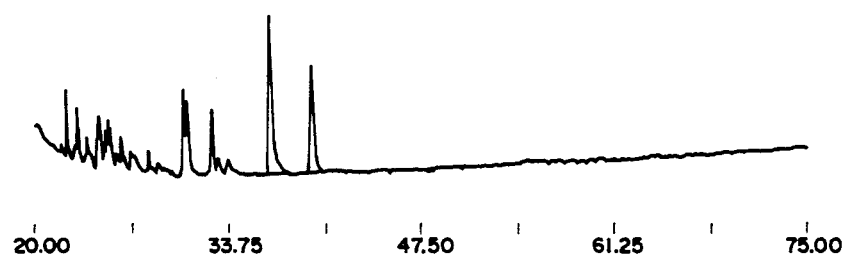
FIG. 17 is the chromatogram of the gas evolved in Reference Example 4.

As will be apparent from the comparison of FIGS. 17 and 14, peaks assigned to isomers of BHC and its impurities decrease drastically under the conditions of Example 2 containing charcoal compared with those in Reference Example 4 containing no charcoal, showing clearly the heat decomposition effect by charcoal. As is evident from FIG. 15, the chlorinated organic compounds are almost completely decomposed at a relatively low temperature of 700° C. in the presence of charcoal and this shows a significant contribution of charcoal to economy. Further, in the system of Example 14 in which copper sulfate is added, the chromatogram of FIG. 16 is almost identical with the base line, showing an almost complete decomposition of the organic substances.

In summary, as is evident from Examples and Reference Exaples, the method of the present invention in which halogenated organic compounds are subjected to heat degradation in the presence of charcoal and an oil achieves a very high degradation efficacy compared with the method in which no charcoal is involved. The present method gives even better results where a metallic catalyst is present additionally.

I claim:

1. A method for non-pollution processing of a halogenated organic compound which comprises subjecting the said compound to combustion at a temperature of about 900°–1200° C. in the presence of charcoal, an oil and as a catalyst for cleaving the carbon halogen bonds in the halogenated organic compound, a compound of copper, nickel, manganese or iron.

2. A method as claimed in claim 1, wherein the said halogenated organic compound is a chlorinated organic compound.

3. A method as claimed in claim 1, wherein the said catalyst is a sulfate or a chloride salt of copper, nickel, manganese or iron.

4. A method as claimed in claim 1, wherein the mixture of the said halogenated organic compound, charcoal, oil and catalyst is in a fluid state.

5. A method as claime in claim 1, wherein the mixture of the said halogenated organic compound, charcoal, oil and catalyst is fed to a combustion furnace continuously.

* * * * *